_United States Patent Office_

3,597,424
Patented Aug. 3, 1971

3,597,424
GOLD-YELLOW TO RED-YELLOW CATIONIC
DYES AND THEIR PREPARATION
Frank Ray Hunter, Wilmington, Del., assignor to E. I. du
Pont de Nemours and Company, Wilmington, Del.
No Drawing. Filed Nov. 7, 1968, Ser. No. 774,184
Int. Cl. C07d 27/38
U.S. Cl. 260—240.8
6 Claims

ABSTRACT OF THE DISCLOSURE

A process for preparing gold-yellow to red-yellow cationic dyes by condensing 1,3,3-trimethyl-2-methylene indoline-omega-aldehyde with a tetrahydroquinoxaline in an alcoholic solvent in the presence of a mineral acid catalyst, and the dyes derived therefrom.

BACKGROUND OF THE INVENTION

(1) Field of the invention

The invention relates to novel gold-yellow to red-yellow cationic dyes and a process for preparing said dyes by condensing Fischer's Aldehyde with a tetrahydroquinoxaline. These dyes are useful in the dyeing of acid-modified fibers.

(2) Description of the prior art

Yellow cationic dyes derived from Fischer's Aldehyde (1,3,3-trimethyl-2-methylene indoline-omega-aldehyde) and aromatic amines are extensively used for dyeing polyacrylic and other acid-modified synthetic fibers, and in general possess such desirable characteristics as high tinctorial value, brightness of shade and good fastness to light. However, such dyes prepared from primary amines, having the general formula:

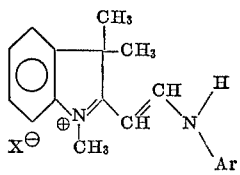

Ar representing an optionally substituted aromatic ring and $X^\ominus$ a solubilizing anion, suffer from a lack of hydrolytic stability under neutral to weakly alkaline conditions, which conditions frequently arise in the dyeing of acrylic-cellulosic blend fabrics with cationic-direct dye mixtures and in the steaming of acrylic prints.

Other art known cationic dyes derived from Fischer's Aldehyde and having the structure:

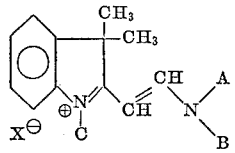

where A and B are either substituted aryl groups, or together form a cyclic structure such as inodiline, tetrahydroquinoline or hexahydrocarbozole, posses greater hydrolytic stability but lack other qualities which are necessary for effective and practical dye production. Dyes of the type depicted above where A and B are separate aryl groups are so costly to produce that they are rendered economically impractical, and those prior art dyes having the formula represented above where A and B form a cyclic structure produce only dyes of green-yellow shade. It has now been discovered that by using a different cyclic structure for A and B, novel gold-yellow to red-yellow dyes are produced which possess good fastness to light on acid-modified synthetic fibers and which also possess outstanding reserve on fibers such as wool, cotton and unmodified polyester and polyamide fibers.

SUMMARY OF THE INVENTION

The present invention comprises yellow cationic dyes of the formula:

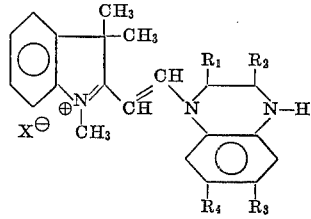

where $R_1$ and $R_2$ independently=H or $CH_3$; $R_3$ and $R_4$ independently=H, Cl, Br, $C_{1-2}$ alkyl or $C_{1-2}$ alkoxy and $X^\ominus$=a water-solubilizing anion.

The process aspect of the invention comprises condensing 1,3,3-trimethyl-2-methylene indoline-omega-aldehyde with a tetrahydroquinoxaline in an alcoholic solvent at a temperature of about 50°–60° C. A mineral acid catalyst is slowly added and the temperature is maintained for approximately one hour after the addition of the acid. The pH is then adjusted to 3 and the resultant dye is recovered.

DESCRIPTION OF THE INVENTION

The limits on the scope of $R_1$ to $R_4$ are imposed by the increasing difficulty in synthesizing substituted tetrahydroquinoxalines containing bulkier groups, which could make manufacture of such dyes difficult.

Tetrahydroquinoxalines can undergo condensation with Fischer's Aldehyde at either nitrogen atom and thus, with asymmetric tetrahydroquinoxalines that are monosubstituted in the 2 or 6 postion, two isomeric products are possible.

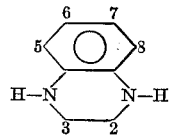

Dyes 2–7 and 14 listed below are therefore depicted as shown, to represent a mixture of two dyes.

Examples of various dyes falling within the bounds of the present invention are:

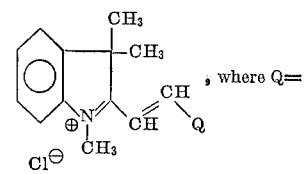

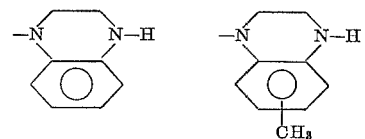

1.    2.

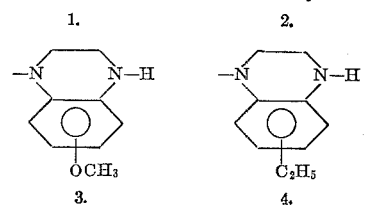

3.    4.

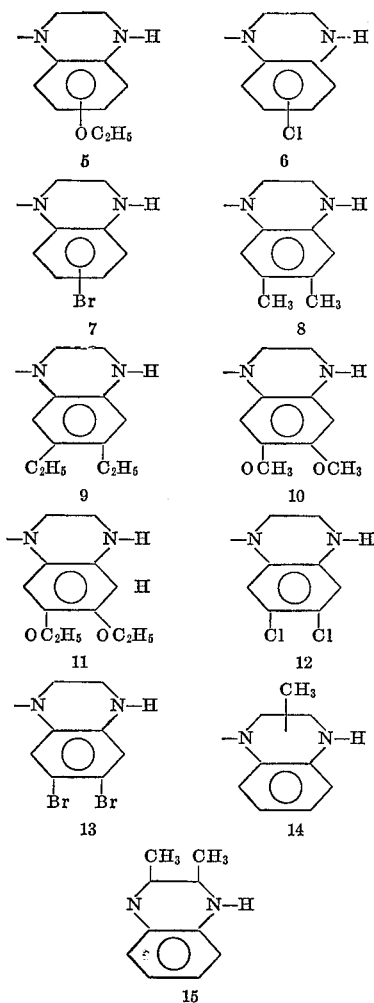

In the general structure above, the water solubilizing anion is shown as chloride, this being the preferred anion. Other anions such as bromide, iodide, sulfate, phosphate, chlorate, fluoroborate, chlorozincate, picrate, acetate or p-toluenesulfonate however could also be used, since the properties of the dyes would remain unchanged except for their degree of water solubility.

Care has to be taken in the preparation of the dyes of this invention to prevent condensation of the quinoxaline molecule with two molecules of Fischer's Aldehyde, giving rise to impurities that are greener in shade and that have poorer fastness to light than the mono-condensation products. This bis-condensation reaction is inhibited by using a large (preferably not less than 50% molar) excess of the quinoxaline and by slow addition of the mineral acid catalyst. A solution of Fischer's Aldehyde and the quinoxaline in an alcohol solvent, preferably methanol, is warmed to 50°–60° C. and a mineral acid (~1.25 equivalents per mole of Fischer's Aldehyde) added over a period of at least 30 minutes. The particular mineral acid used is not critical with acids such as sulfuric acid and phosphoric acid functioning satisfactorily, however hydrochloric acid is preferred. After maintaining the temperature for 1 hour after the addition of acid is complete, the pH is adjusted to 3 and the dye salted out of solution as necessary and isolated by filtration. Larger excesses of the quinoxaline and acid and higher reaction temperatures, while being unnecessary, are not harmful.

The cationic dyes of this invention are useful for dyeing and printing acid-modified fibers, particularly acrylic fibers. They have a high degree of fastness to light, good tinctorial value and economics and exhibit outstanding reserve on wool, cotton, unmodified polyethylene terephthalate and unmodified nylon, rendering said dyes valuable for the coloration of various blend fabrics. They also possess good water solubility, are resistant to hydrolysis and suffer no shade change over the pH range 2 to 7. The qualities are quite necessary, for although acid-modified acrylic fibers are generally dyed at pH 4–5, situations arise when cationic dyes may be subjected to pH conditions falling well outside this range.

As has been pointed out, the dyes of this invention are applicable to acid-modified synthetic fibers by the methods commonly used for basic dyes. Briefly, such fibers are dyed under weakly acid conditions from aqueous dyebaths at or near the boil, the particular fiber or fibers determining the dyebath additives. For example, acrylic fiber may be dyed at the boil in an aqueous dyebath containing 0.5% by weight of the fiber of a nonionic surfactant (such as a condensation product of oleyl alcohol or cetyl alcohol with ethylene oxide), 10% of sodium sulfate, 0–8% of a cationic retarding agent (such as $C_{12-16}$ alkyl trimethylammonium bromide), the amount depending on the shade depth required, and sufficient glacial acetic acid to adjust the pH to 4–5. Acid-modified nylon, however, was developed specifically to obtain multicolor effects in blends with unmodified and "deep-dyeing" nylons, which are dyed with acid dyes. To dye such blends in a dyebath containing both acid and basic dyes, it is necessary to prevent complex formation and subsequent coprecipitation of these two types of dye. This is acheived by using 0.05–0.5% of a sulfobetaine, the preparation of which compounds is described in U.S. 3,280,179. Dyeing is carried out at or just below the boil at pH 3 to 7, but preferably at pH 6 to obtain satisfactory exhaust of both acid and basic dyes.

When samples of acrylic fiber were dyed by the method outlined above with equal weights of the preferred dye of this invention (see Example 1) and the analogous dye from tetrahydroquinoline:

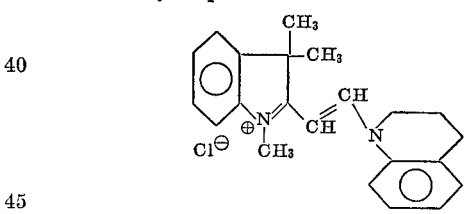

two important differences were apparent; (a) shade and (b) tinctorial strength. The gold-yellow quinoxaline dye was five to ten times as strong as the green-yellow quinoline dye.

The following examples are intended to be merely illustrative of the invention and not in limitation thereof. Unless otherwise indicated, all quantities are by weight.

EXAMPLE 1

24 parts of Fischer's Aldehyde and 24 parts of 1,2,3,4-tetrahydroquinoxaline (corresponding to a 50% molar excess) were dissolved in 58 parts of methanol and warmed to 50°–60° C., after which 17.5 parts of 10 N hydrochloric acid were gradually added with stirring over a period of 30–45 minutes. After warming at 50°–60° C. for a further 1 hour, 108 parts of water were added, the pH was adjusted to 3 with hydrochloric acid and 20 parts of salt were added. On cooling to 20° C., the product separated as red crystals which were isolated by filtration.

The dye had the following structure:

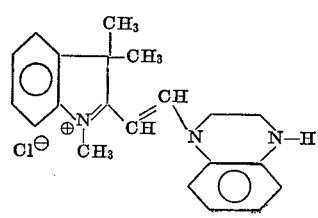

Thin layer chromatography (T.L.C.) on silica gel-coated glass plates, using methyl ethyl ketone/water (10:1) as eluent showed one main component ($R_f \cdot 0.25$) and three minor impurities. The I.R. and N.M.R. spectra were consistent with the above structure. $\lambda max.=430$ m$\mu$ (slight shoulder at 370 m$\mu$); $\epsilon=30,700$ per mole. Acrylic fiber was dyed a golden yellow shade of good fastness to light.

EXAMPLE 2

When the procedure described in Example 1 was carried out using 29 parts of 6,7-dimethyl-1,2,3,4-tetrahydroquinoxaline instead of 24 parts of 1,2,3,4-tetrahydroquinoxaline, a product was obtained which looked similar to the dye of Example 1 on a T.L.C. plate and had an I.R. spectrum consistent with the expected structure:

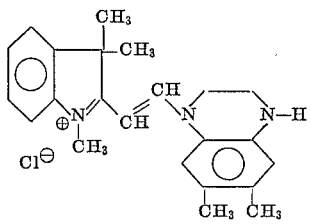

$\lambda max.=440$ m$\mu$ (slight shoulder at 380 m$\mu$) $\epsilon=31,800$ per mole. The shade of this dye was redder than that of the dye in Example 1, and it had good fastness to light.

EXAMPLE 3

When the procedure described in Example 1 was carried out using 29 parts of 6-methoxy-1,2,3,4-tetrahydroquinoxaline instead of 24 parts of 1,2,3,4-tetrahydroquinoxaline, a product was obtained which on T.L.C. was shown to contain two main components of similar $R_f$ value, corresponding to the two possible positional isomers:

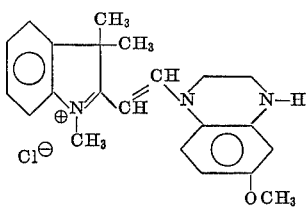

and

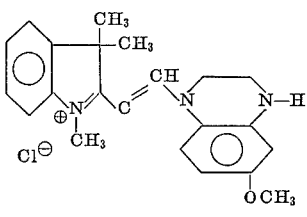

$\lambda max.=440$ m$\mu$ ($\epsilon=24,200$) and 355 m$\mu$ ($\epsilon=10,000$). The I.R. spectrum was consistent for the expected structure. The shade of this dye (mixture) was redder than that of the dye in Example 1, and it had good fastness to light. Essentially equivalent dyes would be formed by substituting 6-methyl, 6-ethyl or 6-chloro-1,2,3,4-tetrahydroquinoxaline for the 6-methoxy derivative in Example 3. They would have the structure shown in cols. 2 and 3, dyes 2, 4 and 6 respectively, and would be a mixture of two isomers as shown in Example 3 above.

The preparation of the tetrahydroquinoxalines is exemplified by the following description:

EXAMPLE 4

Preparation of 1,2,3,4-tetrahydroquinoxaline

A 2-liter steel autoclave was purged with nitrogen and charged with 230 parts of water, 36 parts of 30% aqueous sodium hydroxide and 120 parts of o-phenylenediamine. The charge was warmed to 55° C. and 177 parts of 40% aqueous glyoxal added over 30–60 minutes, the temperature being maintained at 55°–60° C. by external cooling. After agitating for a further ½ hour, a slurry of 11 parts of a nickel/carbon catalyst in 15 parts of water was added to the charge, followed by 193 parts of xylene. The quinoxaline was then hydrogenated at 100° C. and 500 p.s.i.g. for a period of 3 hrs. (i.e., until no more hydrogen is absorbed. The charge was then cooled to 90° C. and the catalyst removed by filtration at 90° C. The liquor was cooled to 5° C., the product filtered and the cake washed well with water under reduced pressure until the pH of the washings had fallen to about 8.

The product was recrystallized from xylene. It had the following structure:

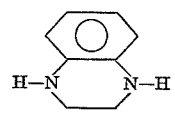

The foregoing detailed description has geen given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Gold-yellow to red-yellow cationic dyes of the formula:

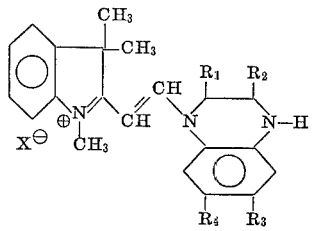

where $R_1$ and $R_2$ independently=H or $CH_3$; $R_3$ and $R_4$ independently=H, Cl, Br, $C_{1-2}$ alkyl or $C_{1-2}$ alkoxy and $X^\ominus$=a water-solubilizing anion.

2. A dye according to claim 1 having the formula:

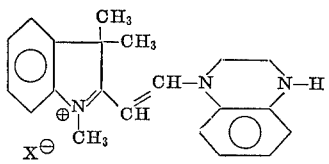

3. Dyes according to claim 1 having the formula:

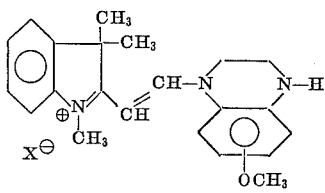

4. A dye according to claim 1 having the formula:

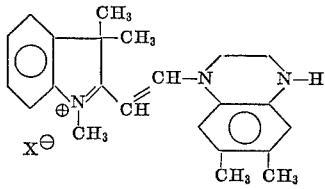

5. Dyes according to claim 1 having the formula:
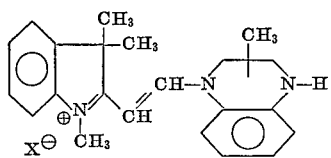
6. A dye according to claim 1 having the formula:
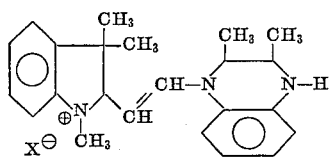
References Cited
UNITED STATES PATENTS
2,263,749    11/1941    White et al. _____ 260—240.8
2,906,588    9/1959    Brunkhorst et al. __ 260—240.8X
JOHN D. RANDOLPH, Primary Examiner
U.S. Cl. X.R.
8—54, 54.2, 177, 178, 179; 106—176

PO-1050
(5/69)

UNITED STATES PATENT OFFICE
CERTIFICATE OF CORRECTION

Patent No. 3,597,424      Dated August 3, 1971

Inventor(s) Frank Ray Hunter

It is certified that error appears in the above-identified patent and that said Letters Patent are hereby corrected as shown below:

In Claim 1, line 1 should be -- 1. A gold-yellow to red-yellow cationic dye of the for- --

In Claim 3, line 1 should be -- 3. Dye according to claim 1 having the formula: --

In Claim 5, line 1 should be -- 5. Dye according to claim 1 having the formula: --

Signed and sealed this 9th day of November 1971.

(SEAL)
Attest:

EDWARD M. FLETCHER, JR.      ROBERT GOTTSCHALK
Attesting Officer      Acting Commissioner of Patents